United States Patent
Vaucourt et al.

(10) Patent No.: US 7,973,487 B2
(45) Date of Patent: Jul. 5, 2011

(54) POWER SUPPLY CIRCUIT

(75) Inventors: Christophe Vaucourt, Langenbach (DE); Erich Bayer, Thonhausen (DE); Paul Brohlin, Parker, TX (US)

(73) Assignee: Texas Instruments Deutschland GmbH, Freising (DE)

( * ) Notice: Subject to any disclaimer, the term of this patent is extended or adjusted under 35 U.S.C. 154(b) by 579 days.

(21) Appl. No.: 12/055,768

(22) Filed: Mar. 26, 2008

(65) Prior Publication Data

US 2009/0174345 A1    Jul. 9, 2009

(30) Foreign Application Priority Data

Mar. 26, 2007   (DE) .................. 10 2007 014 398

(51) Int. Cl.
*H05B 37/02*    (2006.01)
(52) U.S. Cl. .................. 315/224; 315/226; 315/307
(58) Field of Classification Search .............. 315/209 R, 315/224, 225, 226, 209 CD, 227 R, 246, 315/291, 307, 362; 323/908
See application file for complete search history.

(56) References Cited

U.S. PATENT DOCUMENTS

| | | | |
|---|---|---|---|
| 7,304,871 B2 * | 12/2007 | Ito et al. .......................... | 363/59 |
| 7,307,385 B2 * | 12/2007 | Yamamoto et al. ........... | 315/224 |
| 7,425,803 B2 * | 9/2008 | Shao et al. ..................... | 315/308 |
| 2003/0071602 A1 | 4/2003 | Ando | |
| 2005/0104542 A1 * | 5/2005 | Ito et al. ........................ | 315/291 |

FOREIGN PATENT DOCUMENTS

| | | |
|---|---|---|
| DE | 10393192 T5 | 9/2005 |
| DE | 102005030123 A1 | 1/2007 |
| DE | 212005000012 U1 | 2/2007 |
| EP | 1499165 A2 | 1/2005 |
| JP | 07123702 A | 12/1995 |
| WO | 2006081613 A1 | 8/2006 |

* cited by examiner

*Primary Examiner* — Thuy Vinh Tran
(74) *Attorney, Agent, or Firm* — William B. Kempler; Wade J. Brady, III; Frederick J. Telecky, Jr.

(57) ABSTRACT

A power supply circuit is proposed for supplying current to a pair of white LEDs connected in series. The circuit comprises a DC-DC power converter, with a charge pump coupled to the output of the DC-DC power converter. A super capacitor is coupled to the charge pump to be charged to a voltage on top of the converter output in a first mode of operation. The super capacitor is discharged through the pair of LEDs during a second mode of operation. A control stage is provided for switching between the first mode of operation and the second mode of operation.

19 Claims, 1 Drawing Sheet

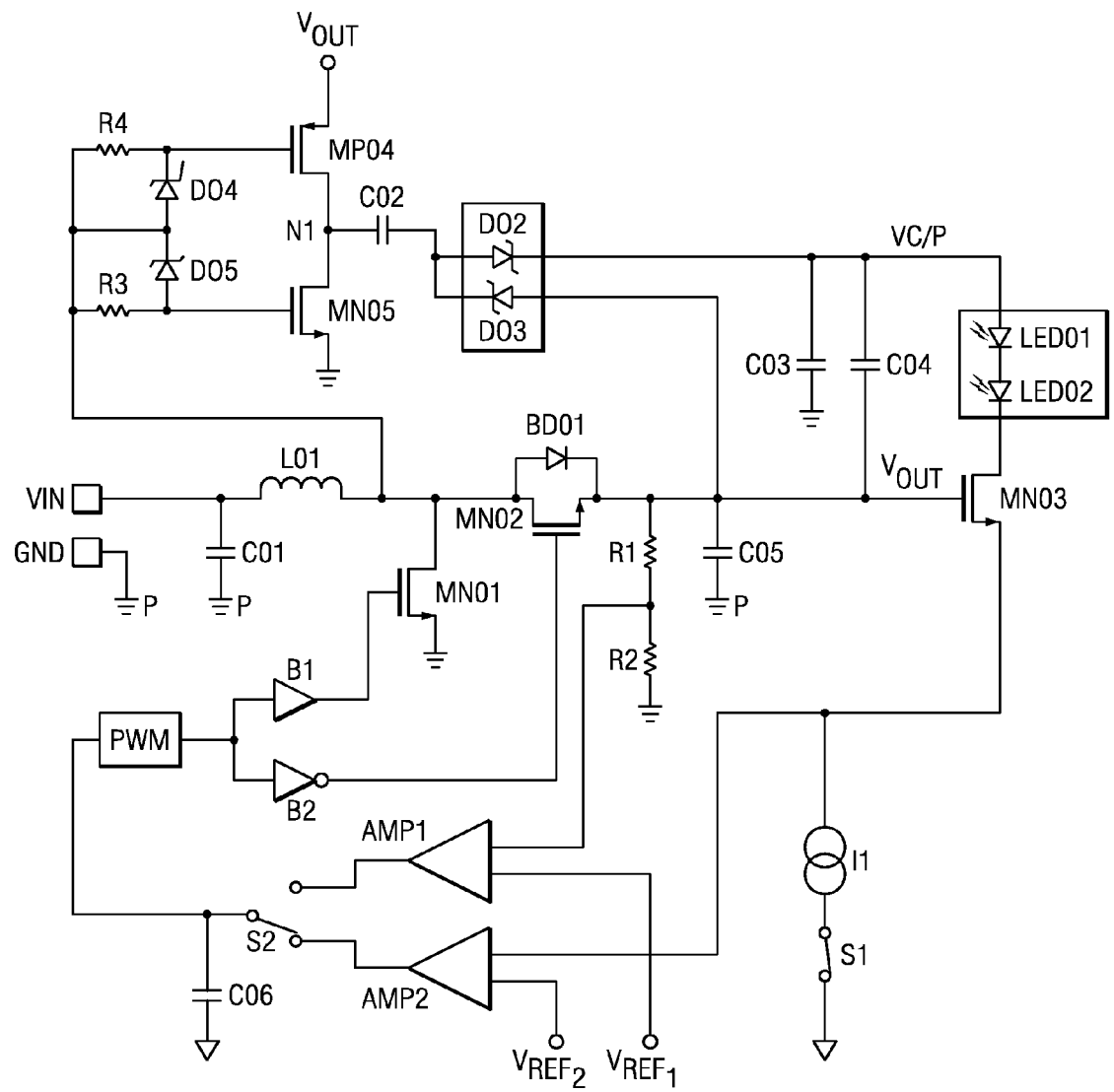

POWER SUPPLY CIRCUIT

This application claims priority from German Patent Application No. 10 2007 014 398.4, filed 26 Mar. 2007.

FIELD OF THE INVENTION

The present invention generally relates to a power supply circuit. More particularly, but not exclusively, the present invention relates to a circuit for supplying power to a high power white LED flashlight, with minimized peak current from the power supply battery.

BACKGROUND

White LEDs are often used in mobile telephones, for example as flashlights for a digital camera integrated in the phone resulting in high peak power needs. This is especially the case when they are used to provide an instantaneous flashlight. Furthermore, it is often the case that several such LEDs are provided. When the LEDs are switched on, they draw a large amount of power from the battery provided as the power supply.

SUMMARY

The present invention has been devised with the foregoing in mind. The present invention provides a power supply circuit for supplying current to a pair of white LEDs connected in series. The circuit comprises a DC-DC power converter and a charge pump coupled to an output of the DC-DC power converter. A super capacitor is coupled to the charge pump and is adapted to be charged to a voltage on top of the voltage at the converter output during a first mode of operation. In a second mode of operation, the super capacitor is discharged through the LEDs so that the LEDs flash. A control stage switches between the first mode of operation and the second mode of operation. This means that the circuit provides enough power to satisfy the high-power requirements of white LEDs, while drawing a minimum amount of current from the power supply battery, which is particularly important in portable electronic devices.

The charge pump preferably comprises an inverter with a supply input connected to the converter output and an output connected to a capacitor of the charge pump. The full output voltage of the converter is therefore used as an input to the charge pump and the voltage generated by the charge pump is added to the output voltage of the converter.

A soft start scheme can be implemented by the control stage including a soft-start pre-charge phase, which limits the inrush current during start-up of the power supply circuit. The control stage can be adapted to switch from the first mode to the second mode of operation only after the converter has completed the soft-start pre-charge phase, for example if the output voltage of the power converter reaches a predetermined voltage level. A possible configuration for the control stage is that it has a first error amplifier with a first input coupled to a first reference voltage source and a second input coupled to a current sink in the current path of the LEDs. A second error amplifier then has a first input coupled to a second reference voltage source and a second input coupled to the output of the power converter. Switching means then connect a control input of a pulse width modulator in the converter with the output of the first error amplifier in a current regulation mode and with the output of the second error amplifier in a voltage regulation control mode.

Preferably, the super capacitor has a capacitance of 0.1 F or greater. and a current regulator is provided in the power supply circuit, which is operable to limit the current through the LEDs during the second "flash" mode of operation.

The power supply circuit according to the invention can be used in any electronic device where it is required to have multi-die white LEDs and is particularly useful in mobile phones having digital cameras with flash. The present invention uses only limited peak power from the battery of such a device so does not place high demands on the power supply.

BRIEF DESCRIPTION OF THE DRAWINGS

Further advantages and characteristics of the invention ensue from a description below of a preferred embodiment, and from the accompanying drawing, in which:

The sole FIGURE is a circuit diagram of a power supply circuit according to the invention.

DETAILED DESCRIPTION OF EXAMPLE EMBODIMENTS

Referring now to the FIGURE, an LED circuit comprises terminals VIN and GND, which are operable to be connected to a voltage supply (not shown), which can be a battery in a portable electronic device. The terminal VIN is connected to the input node of a DC-DC power converter and the terminal GND is connected to ground. The power converter comprises a capacitor C05 and an inductor L01, which form a storage/filtering circuit well-known in the art, operable to provide a constant voltage. The capacitor C05 is connected between the output node of the power converter and ground and the inductor L01 is connected between the input node of the power converter and a node which is connected to the drain terminal of a MOS transistor MN01 and the drain terminal of a MOS transistor MN02.

The source terminal of the transistor MN01 is connected to ground and the drain terminal of the transistor MN02 is connected to one plate of a capacitor C05 and one input of a control stage, which is described in detail below. The other plate of the capacitor C05 is connected to ground. The transistors MN01 and MN02 act as switches and the power converter is operable to provide an output voltage to a voltage rail VOUT. MN02 has an internal body-diode BD01. A pair of Schottky diodes D02 and D03 are connected in series such that the diode D03 is connected to the same node as the capacitor C05 and both diodes D03 and D02 are forward biased in a direction away from the node connected to the capacitor C05.

A node interconnecting the inductor L01 and the drain terminal of the transistor MN01 and the source terminal of the transistor MN02 is connected to a charge pump arrangement. The charge pump comprises a conventional CMOS inverter with an n-type MOS transistor MN05 and a p-type MOS transistor MP04. The transistors MP04 and MN05 have interconnected drain terminals. The source terminal of the transistor MP04 is connected to the voltage rail VOUT and the source terminal of the transistor MN05 is connected to ground. A node N1 interconnecting the drain terminals of the transistors MP04 and MN05 is connected to a coupling capacitor C02, which couples the output of the charge pump to a node interconnecting the diodes D02 and D03 on a voltage rail VC/P (the charge pump output voltage). The node interconnecting the inductor L01 and the transistors MN01 and MN02 is connected to the gate terminals of both transistors MP04 and MN05 via resistors R4 and R3, respectively. Another pair of Schottky diodes D04 and D05 are connected in series between a node interconnecting the gate terminal of the transistor MP04 and the resistor R4 and a node interconnecting the gate terminal of the transistor MN05 and the resistor R3. The diodes are forward biased in a direction from the gate terminal of the transistor MN05 to the gate terminal transistor MP04. A node interconnecting the diodes D04 and D05 is connected to a node interconnecting the resistors R4 and R3.

The cathode of the diode D02 is connected to the input of an LED LED01, and also to one plate of a capacitor C03 and one plate of a capacitor C04. The other plate of the capacitor C03 is connected to ground and the other plate of the capacitor C04 is connected to a voltage rail VOUT, as are one plate of the capacitor C05 and the drain terminal of the transistor MN02. The capacitor C04 is known as a "super-capacitor"; that is, it has a very high value of capacitance of between 0.1 F and 1000 F. The capacitor C03 has a much smaller capacitance than the capacitor C04, about 1 µF, but capacitors C03 and C04 are virtually connected in parallel so as to provide a combined capacitance. The output of the LED LED01 is connected to the input of an LED LED02 so that both LEDs LED01 and LED02 are connected in series with each other. The output of the LED LED02 is connected to the drain terminal of a MOS transistor MN03 so that the LEDs LED01 and LED02 are forward biased in a direction from the cathode of the diode D02 to the drain terminal of the transistor MN03. The LEDs are provided on a separate die from the rest of the circuit but are connected to the capacitors C03 and C04. The interconnection and coupling is such that charge on the capacitors C03 and C04 can supply the LEDs LED01 and LED02. The source terminal of the transistor MN03 is connected to one input of the control stage described below and the gate terminal of the transistor MN03 is connected to the voltage rail VOUT.

The control stage for controlling the power supply circuit and switching between modes of operation is connected to several nodes on the voltage rail VOUT via the switching transistors MN01, MN02 and a cascode transistor MN03. Gate terminals of the transistors MN01 and MN02 are connected to the outputs of drivers B1 and B2, respectively. The driver B2 is configured to output a signal that is the inverse of the signal output from the driver B1 so that when the switch MN01 is ON, the switch MN02 is OFF and vice versa. The output of a pulse width modulator PWM is coupled to the inputs of the drivers B1 and B2 so that both drivers B1 and B2 are controlled by output signals from the pulse width modulator PWM.

A node on the voltage rail VOUT situated between nodes connecting VOUT to the drain terminal of the transistor MN02 and the charge capacitor C05 is connected to a resistor R1. The resistor R1 is connected in series with another resistor R2, which is also connected to ground. A node interconnecting the resistors R1 and R2 is connected to one input of a first error amplifier AMP1. The other input of the amplifier AMP1 is connected to a first reference voltage VREF1. The output of the LED LED02 is coupled, via the cascode transistor MN03, to a current regulator I1 and to one input of a second error amplifier AMP2. The other input of the amplifier AMP2 is connected to a second reference voltage source VREF2. The current regulator I1 is switched to ground by a switch S1. Practically, instead of the switch S1 and current source I1, the current source I1 itself may be switched on and off. The outputs of the error amplifiers AMP1 and AMP2 are both connected to a two-way switch S2, which is operable to connect the output of the first error amplifier AMP1 to the input of the pulse width modulator PWM during the "charge" mode of operation of the circuit and to connect the output of the second error amplifier AMP2 with the input of the pulse width modulator PWM during the "flash" phase of operation. A smoothing capacitor C06 is connected between a node interconnecting the switch S2 and the pulse width modulator PWM input.

In the charge mode of operation, the switch S2 is closed at the output of the amplifier AMP1 so that the output of the amplifier AMP1 is connected to the pulse width modulator PWM. The switch S1 is open and the control stage is switched to a voltage regulation loop. The output signal from the pulse width modulator PWM to the drivers B1 and B2 is high so that the output of B1 is high and the output of B2 is low. Therefore the signal to the gate terminal of the switching transistor MN01 is high and so MN01 is ON and the signal to the gate terminal of the transistor MN02 is low so that MN02 is OFF. The pulse width modulator initially limits the switch peak current of the transistor MN01 so that the current is increased in steps of 250 mA every 500 ms. This is a "soft-start" scheme that limits the inrush current during start of the circuit. This means that the output voltage of the power converter is also limited. Current from the inductor L01 charges the capacitor C05, which generates the output voltage of the power converter at the voltage rail VOUT. The arrangement consisting of resistors R3 and R4 and diodes D04 and D05 which are coupled to the gate terminals of the transistors MP04 and MN05 in the inverter serves to prevent large shoot-through currents through the inverter. Only either MN05 or MP04 is switched on. The voltage at the node N1 is toggling between two potentials: VOUT and ground. This voltage is added to the potential present across the capacitor C02. The diode D02 and the capacitor C03 form a rectification circuit that is used to generate the VC/P output voltage.

The voltage signal output from the inverter is coupled to the diode D02 by the capacitor C02 and is rectified by the diode D02 before being applied to the voltage rail VC/P. The capacitor C03 and the super capacitor C04 are charged and the voltage at VOUT is stepped up to a value of 5.5 V. The voltage level at VOUT; i.e., the output voltage of the power converter is compared with the reference voltage VREF1 by the amplifier AMP1.

In flash mode, the switch S1 is closed. The cascode transistor MN03 is conducting and the switch S2 switches from the output of the amplifier AMP1 to the output of the amplifier AMP2 so that the control stage is now in a current regulation loop. When the switch S1 is closed, limited current flows through the LEDs LED01 and LED02, with the current being limited by the current regulator I1. The LED output voltage is compared with the reference voltage VREF2 at the amplifier AMP2. Because the output of the voltage regulated power converter is combined with the output of the high-value capacitance capacitor in the "fire" phase of operation, which is charged with limited current from the charge pump circuit in the "charge-up" phase of operation, the LED circuit allows a pair of white LEDs to be operated as a flashlight when connected in series, regardless of the battery voltage. The two LEDs connected in series have a higher efficiency compared to a single LED with similar electrical power.

Although the present invention has been described with reference to a specific embodiment, it is not limited to this embodiment and no doubt alternatives will occur to the skilled person that lie within the scope of the invention as claimed.

What is claimed is:

1. A power supply circuit for supplying current to a LED, the circuit comprising:
   a DC-DC power converter with a power input and a power output;

a charge pump coupled to an output of the DC-DC power converter;

a first capacitor coupled to the charge pump and adapted to be either connected to be charged by the charge pump to a voltage on top of the converter output during a first mode of operation or to be connected so as to discharge through the LED during a second mode of operation; and a control stage for switching between the first mode of operation and the second mode of operation, wherein the control stage comprises:

a first error amplifier with a first input coupled to a first reference voltage source and a second input coupled to a current drain in the current path of the LED, a second error amplifier with a first input coupled to a second reference voltage source and a second input coupled to the output of the power converter, and switching means for connecting a control input of a pulse width modulator in the converter with the output of the first error amplifier in a current regulation mode and with the output of the second error amplifier in a voltage regulation mode.

2. The power supply circuit according to claim 1, wherein the charge pump comprises an inverter with a supply input connected to the converter output and an output connected to a second capacitor of the charge pump.

3. The power supply circuit according to claim 2, wherein the inverter is implemented in CMOS technology.

4. The power supply circuit according to claim 3 wherein the LED is a pair of white LEDs.

5. The power supply circuit according to claim 3, wherein the first capacitor is a super capacitor having a capacitance of 0.1 F or greater.

6. The power supply circuit according to claim 2 wherein the LED is a pair of white LEDs.

7. The power supply circuit according to claim 2, wherein the first capacitor is a super capacitor having a capacitance of 0.1 F or greater.

8. The power supply circuit according to claim 1, wherein the control stage has a soft-start scheme including a soft-start pre-charge phase for limiting inrush current during start-up.

9. The power supply circuit according to claim 8, wherein the control stage is adapted to switch from the first mode to the second mode only after the converter has completed the soft-start pre-charge phase.

10. The power supply circuit according to claim 9 wherein the LED is a pair of white LEDs.

11. The power supply circuit according to claim 9, wherein the first capacitor is a super capacitor having a capacitance of 0.1 F or greater.

12. The power supply circuit according to claim 8 wherein the LED is a pair of white LEDs.

13. The power supply circuit according to claim 8, wherein the first capacitor is a super capacitor having a capacitance of 0.1 F or greater.

14. The power supply circuit according to claim 1, wherein the first capacitor is a super capacitor having a capacitance of 0.1 F or greater.

15. The power supply circuit according to claim 14 wherein the LED is a pair of white LEDs.

16. The power supply circuit according to claim 1 wherein the LED is a white LED.

17. The power supply circuit according to claim 1 wherein the LED is a pair of white LEDs.

18. The power supply circuit according to claim 1 wherein the LED is a pair of white LEDs.

19. The power supply circuit according to claim 1, wherein the first capacitor is a super capacitor having a capacitance of 0.1 F or greater.

* * * * *